(12) United States Patent
Dehmann et al.

(10) Patent No.: US 9,019,311 B2
(45) Date of Patent: Apr. 28, 2015

(54) METHOD FOR DISPLAYING A TWO-SIDED TWO-DIMENSIONAL OBJECT ON A DISPLAY IN A MOTOR VEHICLE AND DISPLAY DEVICE FOR A MOTOR VEHICLE

(75) Inventors: Rainer Dehmann, Berlin (DE); Gustav Hofmann, Braunschweig (DE); Mathias Kuhn, Berlin (DE); Frank Hauschild, Berlin (DE)

(73) Assignee: Volkswagen AG, Wolfsburg (DE)

( * ) Notice: Subject to any disclaimer, the term of this patent is extended or adjusted under 35 U.S.C. 154(b) by 514 days.

(21) Appl. No.: 13/055,694

(22) PCT Filed: Jul. 15, 2009

(86) PCT No.: PCT/EP2009/059085
§ 371 (c)(1),
(2), (4) Date: Apr. 20, 2011

(87) PCT Pub. No.: WO2010/010025
PCT Pub. Date: Jan. 28, 2010

(65) Prior Publication Data
US 2011/0187749 A1 Aug. 4, 2011

(30) Foreign Application Priority Data
Jul. 24, 2008 (DE) .......................... 10 2008 034 507

(51) Int. Cl.
*G06T 3/60* (2006.01)
*G06T 19/00* (2011.01)
(Continued)

(52) U.S. Cl.
CPC .......... *B60K 35/00* (2013.01); *B60K 2350/1072* (2013.01); *B60K 2350/2017* (2013.01); *G06F 3/04842* (2013.01)

(58) Field of Classification Search
CPC combination set(s) only.
See application file for complete search history.

(56) References Cited

U.S. PATENT DOCUMENTS 5,463,725 A  10/1995  Henckel et al.
5,754,809 A  5/1998   Gandre
(Continued)

FOREIGN PATENT DOCUMENTS

DE  199 41 955   3/2001
DE  100 01 988   7/2001
(Continued)

OTHER PUBLICATIONS

Penner, Robert. "Easing Equations." Gizma.com/easing, May 30, 2007, retrieved from Internet Archive Wayback Machine Apr. 23, 2013.*

(Continued)

*Primary Examiner* — Ulka Chauhan
*Assistant Examiner* — Schiller Hill
(74) *Attorney, Agent, or Firm* — Kenyon & Kenyon LLP

(57) ABSTRACT

In a method for displaying information in a motor vehicle, at least one two-dimensional object is displayed graphically in a first representation which shows one side of the object, and in a second representation which shows the other side of the object, with the aid of a display mounted in the motor vehicle, different information being shown on the respective sides of the two-dimensional graphical object, and the graphical object extending substantially over the entire size of the display in at least one direction in the first and/or second representation. The representation of the graphical object is altered as a function of a control signal such that the graphical object rotates from one side to the other side in a perspective representation on the display, the two-dimensional graphical object always being fully displayed, at least perspectively, during the rotation. A corresponding display device for a motor vehicle is provided for performing the method.

15 Claims, 4 Drawing Sheets

(51) Int. Cl.
*G06T 15/10* (2011.01)
*G06T 19/20* (2011.01)
*B60K 35/00* (2006.01)
*G06F 3/0484* (2013.01)

(56) References Cited

U.S. PATENT DOCUMENTS

| | | | |
|---|---|---|---|
| 6,486,895 B1 * | 11/2002 | Robertson et al. | 715/776 |
| 6,769,320 B1 | 8/2004 | Bollgohn et al. | |
| 2005/0222726 A1 * | 10/2005 | Furui et al. | 701/36 |
| 2006/0282792 A1 | 12/2006 | Berrill | |
| 2008/0161997 A1 | 7/2008 | Wengelnik et al. | |
| 2009/0058822 A1 * | 3/2009 | Chaudhri | 345/173 |

FOREIGN PATENT DOCUMENTS

| | | |
|---|---|---|
| DE | 100 58 244 | 5/2002 |
| DE | 101 18 765 | 5/2003 |
| DE | 103 03 792 | 8/2004 |
| DE | 103 05 341 | 8/2004 |
| DE | 10 2004 048 956 | 4/2006 |
| EP | 0 547 993 | 6/1993 |
| EP | 1 212 208 | 6/2002 |
| EP | 1 736 859 | 12/2006 |
| GB | 2 406 768 | 4/2005 |
| WO | 2006/108617 | 10/2006 |
| WO | 2009/024474 | 2/2009 |

OTHER PUBLICATIONS

International Search Report, issued in corresponding International Application No. PCT/EP2009/059085.

Written Opinion of the International Searching Authority, issued in corresponding International Application No. PCT/EP2009/059085.

\* cited by examiner

METHOD FOR DISPLAYING A TWO-SIDED TWO-DIMENSIONAL OBJECT ON A DISPLAY IN A MOTOR VEHICLE AND DISPLAY DEVICE FOR A MOTOR VEHICLE

FIELD OF THE INVENTION

The present invention relates to a method for displaying information in a motor vehicle, in which at least one two-dimensional object is displayed graphically in a first representation which shows one side of the object and in a second representation which shows the other side of the object, with the aid of a display mounted in the motor vehicle. Different information is shown on the respective sides of the two-dimensional graphical object. Moreover, in the first and/or second representation, the graphical object extends substantially over the entire size of the display in at least one direction. The present invention further relates to a display device for a motor vehicle having a display for the graphical representation of information, which is mounted in the motor vehicle. In addition, the display device includes a control device by which graphic data are able to be generated that depict at least one two-dimensional graphical object, displayable on the display, in a first representation which shows one side of the object and in a second representation which shows the other side of the object. As in the case of the method, different information is shown on the respective sides of the two-dimensional graphical object. Furthermore, in the first and/or second representation, the graphical object extends substantially over the entire size of the display in at least one direction.

BACKGROUND INFORMATION

In a motor vehicle, there are various information and communication areas to which indicating instruments are assigned. They are used to provide information to the driver and passengers. Moreover, they are able to assist the driver in navigation or communication with the outside world. In particular, the display is able to visually represent vehicle data related to traffic or operation. What is termed the instrument cluster is disposed in the vicinity of the primary field of view of the driver. Usually it is located in the cockpit behind the steering wheel and is visible through an opening in the steering wheel. It is used especially to display the speed, the fuel-tank level, the radiator temperature and other motor-vehicle information specific to operation. In addition, radio and other audio functions may be displayed. Finally, menus for telephone, navigation, telematic services and multimedia applications may be displayed. Usually liquid-crystal displays in various forms are used as display.

Because of the space conditions in the passenger compartment of a motor vehicle, the displays used in the vehicle are usually relatively small. In representing information on such a display, it is therefore particularly important that the graphical representation of the information utilize the size of the display as well as possible. In the case of example embodiments of the present invention, at least in one type of representation, the graphical object shown on the display extends substantially over the entire size of the display, so that the driver or a passenger is able to comprehend the information represented by the graphical object as easily and quickly as possible.

For example, German Published Patent Application No. 100 01 988 describes an instrument cluster for the display of operation-related and/or traffic-related data. To permit better comprehension of the diverse offering of information, German Published Patent Application No. 103 03 792 describes a perspective representation of three-dimensional elements.

As a further display device, a vehicle frequently possesses a multifunction display in the center console or above the center console. Such a display for a multifunction operating element is described, for example, in German Published Patent Application No. 199 41 955.

In order to present the various operating and display possibilities in clearly arranged fashion, hierarchical menu structures are frequently used. A menu shows various menu items and, if applicable, graphics or icons assigned to the menu items. Upon selection of a menu item, a submenu having further submenu items opens. This structure may be continued over several hierarchical levels. In addition, instead of being assigned a submenu, a menu item may be assigned a specific display image which represents the information assigned to the menu item.

If such menu structures are used in a motor vehicle, the problem arises that navigation within these menu structures and the absorption of the information indicated by the display claim the attention of the driver such that at least in the case of some applications, such as entering a destination for the navigation system, the simultaneous safe driving of the motor vehicle by the driver is impaired. Thus, if the driver wants to operate the devices for such applications of the vehicle, he should do so prior to beginning to drive or should interrupt the drive in order to operate them. However, such drawbacks for the user operation are undesirable.

It is therefore desirable that the information be displayed in the motor vehicle such that it may be absorbed quickly and intuitively by the driver, so that the comprehension of the displayed information does not cause the driver to be distracted while driving. Furthermore, the operation should be executable so intuitively, easily and quickly that the driver is able to operate the devices of the vehicle, whose information is displayed by the display device, while driving, as well, even if possibly complex hierarchical structures are displayable by the display device. The display of information and the operator control associated with a display of information in the motor vehicle thus contribute to safety when driving the motor vehicle.

SUMMARY

Example embodiments of the present invention provide a method and a display device, in which the displayed information is able to be comprehended as quickly and intuitively as possible, and which permit a rapid, intuitive and simple operator control of vehicle devices whose information is displayed.

The method of example embodiments of the present invention is characterized in that the representation of the graphical object is altered as a function of a control signal such that the graphical object rotates from one side to the other side in a perspective representation on the display, the two-dimensional graphical object always being fully displayed, at least perspectively, during the rotation.

Customarily, the rotation of a graphical object is represented such that the display area which is taken up by the object within the display during the rotation includes areas of the display which are not included by the end positions at the beginning of the rotation and at the end of the rotation. Therefore, such a rotation cannot be represented if, in the starting position, the graphical object substantially fully occupies the size of the display, at least in one direction. Thus, in the case of the method according to example embodiments of the present invention, it is possible for the graphical object to completely fill the display in at least one direction, so that the information represented by the object is able to be shown to as to be very large and therefore very quickly and easily comprehensible for the observer, and at the same time, a rotation of the graphical object from one side to the other side is completely visually displayed.

To represent the rotation, preferably the control device generates successive intermediate images of the graphical object, resulting in an animation of the rotation of the object.

According to example embodiments of the present invention, the control device alters the graphic data such that the graphical object is rotated about a vertical axis, which at least at the beginning of the rotation, lies outside of the graphical object, or extends through the laterally outermost point at the edge of the graphical object. In this context, the vertical direction is the direction of the height of the display, and the horizontal direction is the direction of the width of the display. The direction of the height and of the width of the display is defined by a preferred orientation in the representation of the information on the display. For example, if text is shown on the display, the letter height extends in the vertical direction, whereas a text line extends in the horizontal direction. Usually the display is mounted in the passenger compartment of the motor vehicle such that the display area extends in a vertically aligned plane. Even if the display in the motor vehicle is not aligned so as to be exactly vertical, the vertical axis of rotation should be understood to be an axis which lies in the display plane and extends in the direction of the height of the display.

In the method, especially in the horizontal direction, the graphical object extends over the entire width of the display. In this case, at least at the beginning of the rotation, the vertical axis of rotation is formed by the vertical lateral edge of the display or of the graphical object. Particularly preferred, at least at the beginning of the rotation, the graphical object completely fills the size of the display.

According to example embodiments of the present invention, the control device alters the graphic data such that the vertical axis is shifted in the horizontal direction during the rotation, and at the same time, the graphical object is rotated about the vertical axis, so that after a rotation of 180°, the vertical axis has reached the position in the second representation of the graphical object, in which the other side is displayed. The animation of the rotation of the graphical object is therefore made up of two transformations: First, the axis of rotation moves in the horizontal direction, and secondly, a rotation is executed about this axis. There are various possibilities for the type of coupling of these two movements. In the method, the control device alters the graphic data so that the horizontal shift of the vertical axis preferably is synchronized linearly with the rotation of the graphical object. This does not mean that the shift or rotation is a linear movement, but only that a change in the angle of rotation by a certain fraction of the total rotation of 180° results in a shift of the vertical axis by the same fraction of the total shift of the axis.

According to example embodiments of the present invention, the rotation of the graphical object is subdivided into a first phase in which pixels of the graphical object are accelerated, and a second phase in which pixels of the graphical object are decelerated. Because of the synchronization of the rotary motion with the shift of the vertical axis, the shift of the axis is therefore also subdivided into the two phases, so that the movement of the axis is accelerated in the first phase and decelerated in the second phase. For example, the first phase corresponds to an angle of rotation of the graphical object from 0° to 90° and a shift of the vertical axis up to the middle of the display, and the second phase corresponds to an angle of rotation of the graphical object from 90° to 180° and a shift of the vertical axis from the middle to the other lateral edge of the display.

An accelerated movement is understood here to be a positive acceleration during which the speed increases, and a decelerated movement is understood to be a negative acceleration during which the speed decreases.

In the method, the manner in which the objects are rotated is of special importance. Namely, how well and how quickly the viewer is able to orient himself in the objects, even if they have been rotated, depends on the representation of this rotation. In this context, many animation techniques which are used outside of the motor vehicle for the variable graphic display of objects are unsuitable for use in the motor vehicle, since in the vehicle, the observer only looks at the display for brief moments. Therefore, the time characteristic of the change in a position of a graphically displayed object is also of special significance for safety in driving the vehicle.

According to example embodiments of the present invention, the following computational steps are carried out in calculating the graphic data for successive intermediate images to represent the rotation—the successive positions x of the pixels of the graphical object—in the first phase:

$$n = \frac{t - t_0}{d_1} \quad \text{(i)}$$

$$x = b_1 + c_1 \cdot n^4 \quad \text{(ii)}$$

where t is a system time at which the generated graphic data are shown on the display, where $t=t_0$ at the beginning of the rotation of the first phase, $d_1$ is the duration of the first phase, $b_1$ is the starting position of the pixel of the graphical object, $c_1$ is the total shift of the pixel of the graphical object in the first phase, and steps (i) and (ii) are repeated until: $t>(t_0+d_1)$.

For example, in this context, the parameter x may represent the horizontal position of one dot of the graphical object or an angle of rotation.

In addition, the following computational steps are carried out in calculating the graphic data for successive intermediate images to represent the rotation—the successive positions x of the pixels of the object—in the second phase:

$$n = \frac{t - t_0}{d_2} - 1 \quad \text{(i)}$$

$$x = b_2 + c_2 \cdot (1 - n^4) \quad \text{(ii)}$$

where t is a system time at which the generated graphic data are shown on the display, where $t=t_0$ at the beginning of the rotation of the second phase, $d_2$ is the duration of the second phase, $b_2$ is the starting position of the pixel of the object, $c_2$ is the total shift of the pixel of the object in the second phase, and steps (i) and (ii) are repeated by the arithmetic logic unit until: $t>(t_0+d_2)$.

Furthermore, the duration of the total rotation is of special importance for the comprehensibility of the displayed information. In the method, the duration of the total rotation is in a range of 0.25 second to 2 seconds, preferably in a range of 1.2 seconds to 1.8 seconds. In particular, the duration of the rotation of the first phase is in a range of 0.25 second to 1 second, and preferably in a range of 0.6 second to 0.8 second, especially 0.7 second. Furthermore, the duration of the rotation of the second phase is in a range of 0.25 second to 1 second, preferably in a range of 0.6 second to 0.8 second, particularly 0.7 second. It is further preferred that the duration of the rotation of the first phase correspond to the duration of the rotation of the second phase.

According to example embodiments of the present invention, the speed of the motor vehicle is measured, and the duration of the total rotation or the duration of the rotation of the first and/or second phase is ascertained as a function of the speed of the motor vehicle. By preference, the higher the speed of the motor vehicle, the longer the duration of the rotation. Namely, at higher speeds, the driver can only direct his eye toward the display for shorter time intervals. Moreover, the spacing of the time intervals in which the driver directs his eye toward the display is greater, since at higher speeds, the driver must focus greater attention on the driving process. The coupling of the rotational duration of the two-dimensional object to the speed of the motor vehicle therefore ensures that at higher speeds, the driver retains his orientation in the information display, and in this manner, is able to comprehend the information contents easily, quickly and intuitively.

In the method, the control signal by which the rotation of the graphical object is initiated may be triggered by the input on the part of a user or may be generated automatically. For example, the input by a user may be accomplished by touching the display. According to example embodiments, the input is accomplished by a gesture of a body part of a user, which is performed in front of the display. The gesture is detected and evaluated by an input device or another downstream device. For instance, the gesture of the body part of the user may be detected by a capacitive coupling between the body part and a receiving device. Furthermore, the gesture of the body part of the user may be detected by an emission of infrared radiation and reflection of this infrared radiation by the body part of the user.

The display device according to example embodiments of the present invention is characterized in that the graphic data are able to be altered by the control device such that the graphical object rotates from one side to the other side in a perspective representation on the display, the two-dimensional graphical object always being fully displayed, at least perspectively, during the rotation.

In particular, the graphic data are able to be altered by the control device such that the graphical object is rotated about a vertical axis, which at least at the beginning of the rotation, lies outside of the graphical object or extends through the laterally outermost point at the edge of the graphical object.

In particular, the control device is able to generate graphic data for successive intermediate images to represent the rotation. In calculating the graphic data for successive intermediate images in the first and second phase, respectively, in particular, the above-indicated computational steps for the first and second phase are executable by the control device. The duration for the rotation for the first and second phase, respectively, is especially within the ranges indicated above, as well.

According to example embodiments of the present invention, the display device includes an interface for the reception of data concerning the speed of the motor vehicle. In this case, the duration of the total rotation or the duration of the rotation of the first and/or second phase is ascertainable by the control device as a function of these speed data.

According to example embodiments of the present invention, the display device includes an input device. For instance, with the aid of this input device, a user is able to generate a control signal which triggers the rotation of the graphical object. The input device may be a touch-sensitive surface of a display. Preferably, the input device is a device for detecting and evaluating a gesture of a body part of a user, which is performed in front of the display. For that purpose, in particular, the input device may include a receiving device to which a signal from the body part of the user is transmittable capacitively when the body part is in the vicinity of the receiving device. The position of the body part is able to be detected with the aid of this capacitive coupling. A gesture of the user may be inferred from the change in this position over time.

Furthermore, the input device may include an infrared-light source or a receiver for reflected infrared light for detecting the gesture of the body part of the user. The position of the body part and its change over time is sensed and interpreted as gesture in this case, as well.

Finally, example embodiments of the present invention provide a motor vehicle having the display device described above.

Example embodiments of the present invention shall now be explained with reference to the Figures.

DETAILED DESCRIPTION

Figure 1:
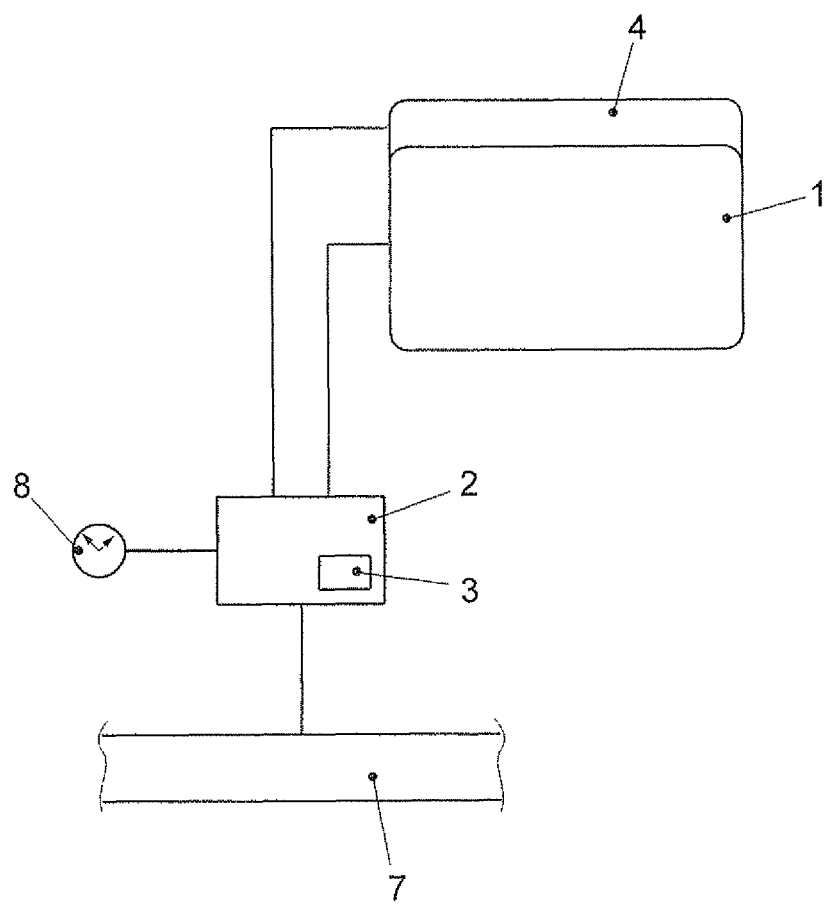
FIG. 1 shows schematically a display device according to an example embodiment of the present invention and the connection of this display device to other devices of the motor vehicle.

The display device includes a display 1 for the graphical representation of information. Display 1 may be a matrix display, e.g., an LCD (liquid crystal display), especially a color display using TFT (thin-film transistor) technology. Furthermore, the display may be what is referred to as a twisted nematic-liquid crystal display (TN-LCD), a super twisted nematic (STN) display, a double-layer STN, an FLC (ferroelectric liquid crystal) display or an SSFLC (surface stabilized ferroelectric liquid crystal). Display 1 is assigned a back-lighting (not shown) which may be provided by one or more light-emitting diodes. Display 1 is freely programmable, that is, any desired graphic data may be generated, which are represented on display 1.

In particular, display 1 is mounted in an area of the vehicle that is clearly visible for at least the driver. If the operator control of the devices of the vehicle is coupled directly to the placement of the display, so that, for example, the user must bring his hand or his finger at least into the vicinity of display 1 in order to make inputs, then display 1 is positioned such that the driver of the vehicle may easily reach it with his hand or his finger. For instance, display 1 may be accommodated in the center console of the vehicle.

Display 1 is connected to a control device 2, by which graphic data are able to be generated for graphical objects displayable on display 1. Control device 2 is also connected to an input device 4, via which the user is able to control devices of the vehicle whose information is displayed on display 1.

For example, input device 4 may be a device for detecting and evaluating a gesture of a body part of a user. For instance, the hand of the user may perform the gesture in front of display 1. In so doing, the three-dimensional position of the hand is detected in a specific location area in front of display 1 without it being necessary to touch display 1. The permitted location area is a function of the placement of display 1 in the motor vehicle. The area should be selected such that the stay of the hand of a user in this location area may be associated unequivocally with an operative control of input device 4. For instance, the boundary of the location area may lie 40 cm to 10 cm in front of display 1. If the hand of the user is brought up closer than this threshold value to display 1, this is detected by input device 4, and the approach is interpreted as an operating intention. For instance, this may lead to the objects displayed by display 1 being shown differently. Furthermore, this may be interpreted as an input which leads to a rotation of the graphical object, as described later in detail. Input device 4 detects the position and the movement of the hand of the user in the location area. In so doing, various gestures performed by the hand are recognized and interpreted as inputs.

For example, input device 4 may include infrared-light sources and infrared-light receivers, which detect the infrared light reflected by the hand. Details of such an input device are described in German Published Patent Application No. 100 58 244, which is expressly incorporated herein in its entirety by reference thereto. Further input devices which may be used in conjunction with the display device are described in the following: German Published Patent Application No. 103 05 341 and German Published Patent Application No. 10 2004 048 956.

Furthermore, the position of the hand and its change over time may also be detected by an optical system. In this system, for example, a light-emitting diode emits square-wave, amplitude-modulated light. This light is reflected by the object to be detected, i.e., the hand, and after the reflection, arrives at a photodiode. A further light-emitting diode likewise emits square-wave, amplitude-modulated light to the photodiode, this light, however, being phase-shifted by 180°. At the photodiode, the two light signals superimpose and cancel each other out if they have exactly the same amplitude. If the signals do not cancel each other out at the photodiode, the light emission of the second diode is regulated via a control loop such that the total received signal again adds up to zero. If the position of the object changes, the light component which arrives at the photodiode from the first light-emitting diode via the reflection at the object also changes. This brings about a correction of the intensity of the second light-emitting diode through the control loop. The control signal is therefore a measure for the reflection of the light, which is emitted by the first diode, at the object. In this manner, a signal which is characteristic for the position of the object may be derived from the control signal.

In addition, the input device may be a touch-sensitive foil, which is provided on display 1. The position at which display 1 disposed behind the foil is touched may be detected by the foil. For example, the foil may take the form of a resistive touch foil, capacitive touch foil or piezoelectric foil. In addition, the foil may be formed such that a flow of heat, which emanates from the finger of a user, for example, is measured. Various inputs may be obtained from the development of the touching of the foil over time. For instance, in the simplest case, the touching of the foil at a specific position may be assigned to a graphical object displayed on display 1. Sliding motions of the finger over the foil may be interpreted, as well.

In particular, in this manner, the user is able to define a line on display 1 by touching the foil at one point, sliding to another point on the foil and removing the finger from the foil at the other point.

Finally, a remote operator control element may be used as input device. In particular, the remote operator control element is a mechanical control element. For instance, a rotary switch may be provided by which objects shown on the display are controllable and are selectable by pressing the rotary switch. Furthermore, an angle of rotation may also be input directly by the rotary switch, as explained later. In addition, separate pressure switches may be disposed around the rotary switch, the arrangement of display fields on the display, which are assigned to the pressure switches, corresponding at least schematically to the arrangement of the pressure switches. The information system may include a multifunction operating device, for example, as described in European Published Patent Application No. 1 212 208.

Control device 2 is further coupled to a system clock 8 and to a vehicle bus 7. Control device 2 is connected to driver-assistance systems of the vehicle via vehicle bus 7. Control device 2 receives data from these driver-assistance systems via vehicle bus 7, and prepares these data so that they are displayed graphically to the driver or the vehicle occupants via display 1. To this end, control device 2 generates graphic data for objects displayable on display 1, which, inter alia, graphically represent the information of the driver-assistance systems. Control device 2 is further connected via vehicle bus 7 to various information devices and communication devices, as well as entertainment devices of the vehicle. The varied information from these vehicle devices is processed in control device 2 and converted into graphic data for a graphical representation. For animations of the graphical representation on the display, the control device includes an arithmetic logic unit 3 which refers to system clock 8 in the generating of intermediate images.

Figure 2:
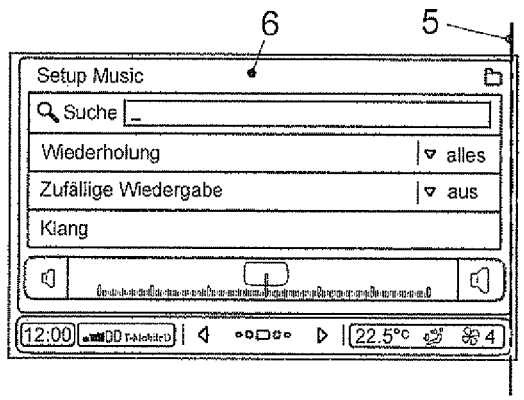
FIGS. 2 to 8 show representations on the display, generated by the method according to an example embodiment of the present invention, in which the graphical object is rotated.
Figure 3:
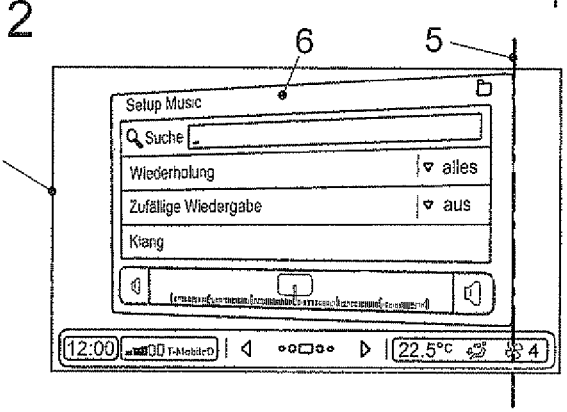
Figure 4:
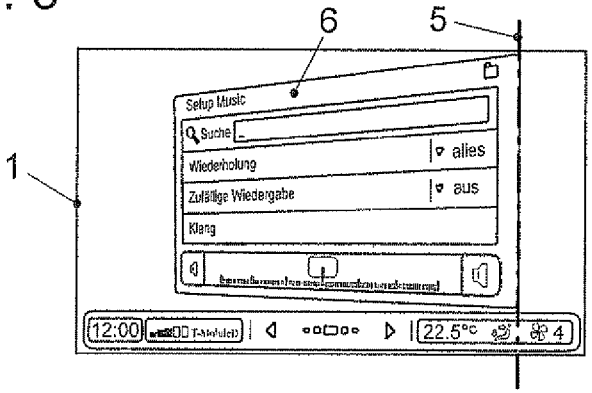
Figure 5:
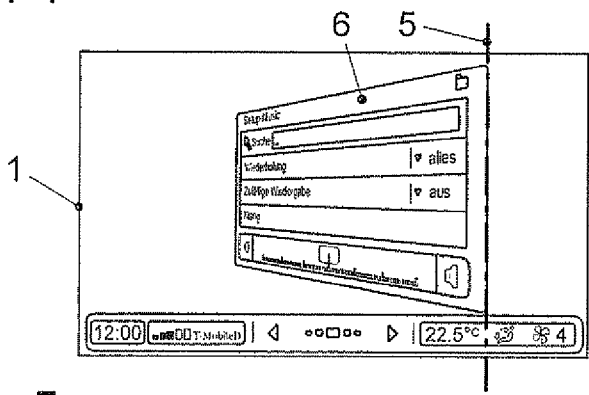
Figure 6:
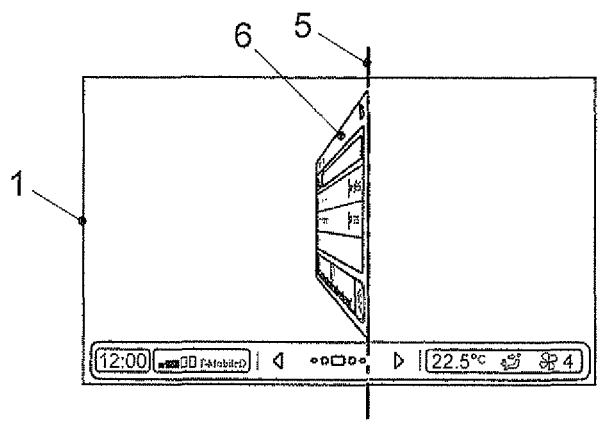
Figure 7:
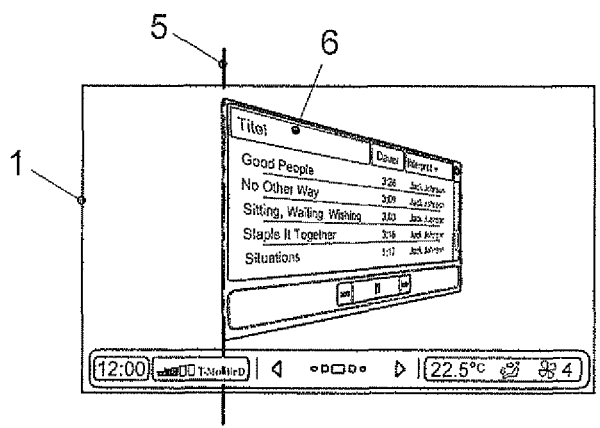
Figure 8:
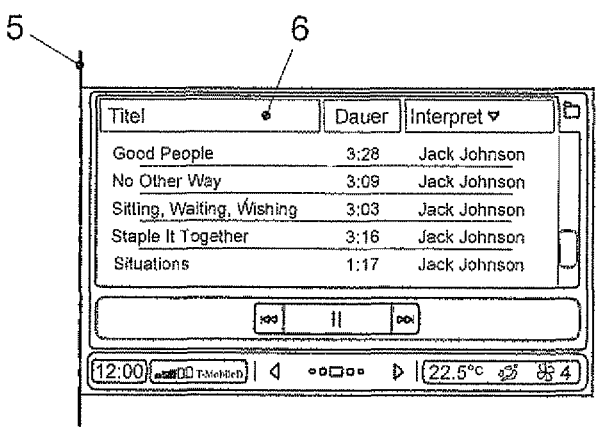

In the following, the information readout on display 1 in the vehicle is explained in detail:

Object 6 displayed by display 1 is a graphical representation of an area which fills up the entire size of display 1 in at least one direction. In the case of the example described hereinafter, graphical object 6 fills display 1 completely. In a first representation which is rendered in FIG. 2, graphical object 6 represents one side of the object, and in a second representation, which is rendered in FIG. 8, represents the other side of the object. Different information is shown on both sides. On the side which is depicted in FIG. 2, an operating panel is shown in the setting mode. In this representation, the user is able to implement detail settings of a specific application by input device 4. The operating panel on the other side of graphical object 6, which is shown in FIG. 8, relates to an operating mode in which an application is able to be operated.

In order to get from the view shown in FIG. 2 to the view shown in FIG. 8, the user is able to implement an input with the aid of input device 4, and thereby trigger a corresponding control signal to rotate graphical object 6. The representation of graphical object 6 is changed as a function of this control signal such that graphical object 6 rotates from one side to the other side in a perspective representation on display 1. Intermediate images are generated by arithmetic logic unit 3 of control device 2 to represent the rotation. Some of these intermediate images are shown in FIGS. 3 through 7.

For the rendering of the rotation, the graphic data, which result in the display on display 1, are altered such that graphical object 6 is rotated about a vertical axis 5. At the beginning of the rotation, that is, in the case of the representation shown in FIG. 2, vertical axis 5 coincides with the right vertical lateral edge of graphical object 6. In the course of the rotation, vertical axis 5 is shifted in the horizontal direction from the right edge of display 1 to the left edge of display 1. At the same time, graphical object 6 is rotated about vertical axis 5, as shown in FIGS. 2 through 8. After a rotation of 180°, vertical axis 5 is at the left edge of display 1, and the other side of graphical object 6 is shown. In this context, the horizontal shift of vertical axis 5 is synchronized linearly with the rotation of graphical object 6.

The rendering of the rotation in the method has the feature that during the rotation, graphical object 6 is always fully displayed, at least perspectively. It may be that the area which graphical object 6 occupies on display 1 becomes smaller during the rotation due to the perspective representation, however perspectively, graphical object 6 can always be seen completely. To be sure, after a rotation of 90°, only the virtual lateral edge of two-dimensional graphical object 6 can be seen; however, this corresponds to the correct perspective representation of object 6 rotated by 90°. Thus, object 6 is fully displayed perspectively in this case, as well. In the end position after a rotation of 180°, one side of graphical object 6 is again completely visible. In this position, graphical object 6 again completely fills display 1.

In the method described above for rotating graphical object 6, the transition between two static representations on display 1, in which the front side and back side, respectively, of object 6 are shown, is especially important. Namely, since the display device is accommodated in a motor vehicle, it is especially important that, in particular, the driver of the motor vehicle is able to quickly, easily and intuitively comprehend the information shown on display 1, even if he only directs his eye to display 1 for brief time intervals. In this context, it is especially important that at any time, the viewer is able to distinguish well between the two sides of the display. It has come to light that abrupt changes of display images are disadvantageous for this. In particular, fluid transitions between two static representations, during which intermediate images are displayed that clarify the transition between the two static representations, facilitate the orientation in the structure as well as the comprehensibility of the information content.

Moreover, it is especially important how the intermediate images visually display the transition between two static representations. In this instance, it has turned out that a non-linear transition from one static representation to the next static representation is advantageous for the practical application in a motor vehicle. In particular, intermediate images are advantageous which illustrate a movement of objects 6 that is accelerated and decelerated. The parameters for the selection of the acceleration and the duration of the transition must also be adapted to the application in the vehicle, so that for the most part, conventional animations familiar from the computer field are not usable.

In the following, it is described in detail how graphical object 6 is rotated in terms of time:

The rotation of graphical object 6 is subdivided into two phases. During the first phase, object 6 is rotated from a starting position, shown in FIG. 2, by 90° into a neutral position in which only the lateral face of graphical object 6 is visible. In a second phase, the graphical object is rotated further up to an angle of rotation of 180°, until the other side of graphical object 6 shown in FIG. 8 is visible. During the rotation, the side of graphical object 6 visible in each case continues to be represented perspectively on the respective surface. The perspective representation of the rotation takes place such that the viewer is looking directly at graphical object 6, that is, the viewing direction for the perspective view runs parallel to the normal of display 1.

For instance, if one assumes that the width of display 1 and of graphical object 6 is 800 pixels, and if one denotes the dots at the right edge of graphical object 6 with 0, initially in the first phase, the pixels of the right edge of graphical object 6 travel during the movement up to pixel 400 in the middle of display 1, and from there, up to pixel 800 at the left edge of display 1. Likewise, one is able to observe the angle of rotation by which graphical object 6 has been rotated about vertical axis 5. In the view shown in FIG. 2, the angle of rotation is 0°, in the view shown in FIG. 6, the angle of rotation is somewhat less than 90°, and in the display shown in FIG. 8, the angle of rotation is 180°. In the following, the parameterization of the rotary motion is described on the basis of position x, which, for example, is able to represent the position of vertical axis 5 or of one pixel of object 6 in the horizontal direction. Since the movement of vertical axis 5 is synchronized linearly with the rotary motion, position x may also be interpreted as angle of rotation, which runs from 0° to 180°.

The rotation of graphical object 6 is represented by successive intermediate images that indicate successive positions of the pixels of graphical object 6. The following computational steps are carried out in calculating the graphic data for these positions x in the first phase:

$$n = \frac{t - t_0}{d_1} \quad \text{(i)}$$

$$x = b_1 + c_1 \cdot n^4 \quad \text{(ii)}$$

where t is a system time at which the generated graphic data are shown on display 1, where $t=t_0$ at the beginning of the rotation of the first phase, $d_1$ is the duration of the first phase, $b_1$ is the starting position of the pixel of graphical object 6, $c_1$ is the total shift of the pixel of graphical object 6 in the first phase, and steps (i) and (ii) are repeated until: $t>(t_0+d_1)$.

For the second phase, the following computational steps are carried out:

$$n = \frac{t - t_0}{d_2} - 1 \quad \text{(i)}$$

$$x = b_2 + c_2 \cdot (1 - n^4) \quad \text{(ii)}$$

where t is a system time at which the generated graphic data are shown on display 1, where $t=t_0$ at the beginning of the rotation of the second phase, $d_2$ is the duration of the second phase, $b_2$ is the starting position of the pixel of graphical object 6, $c_2$ is the total shift of the pixel of graphical object 6 in the second phase and steps (i) and (ii) are repeated until: $t>(t_0+d_2)$.

The computational steps are executed by arithmetic logic unit 3 of control device 2, system time t being transmitted from system clock 8 to arithmetic logic unit 3.

Duration $d_1$ of the rotation of the first phase is in a range from 0.25 second to 1 second, particularly in a range from 0.6 second to 0.8 second. Likewise, the duration of the rotation of the second phase is in a range from 0.25 second to 1 second, particularly in a range from 0.6 second to 0.8 second.

Figure 9:
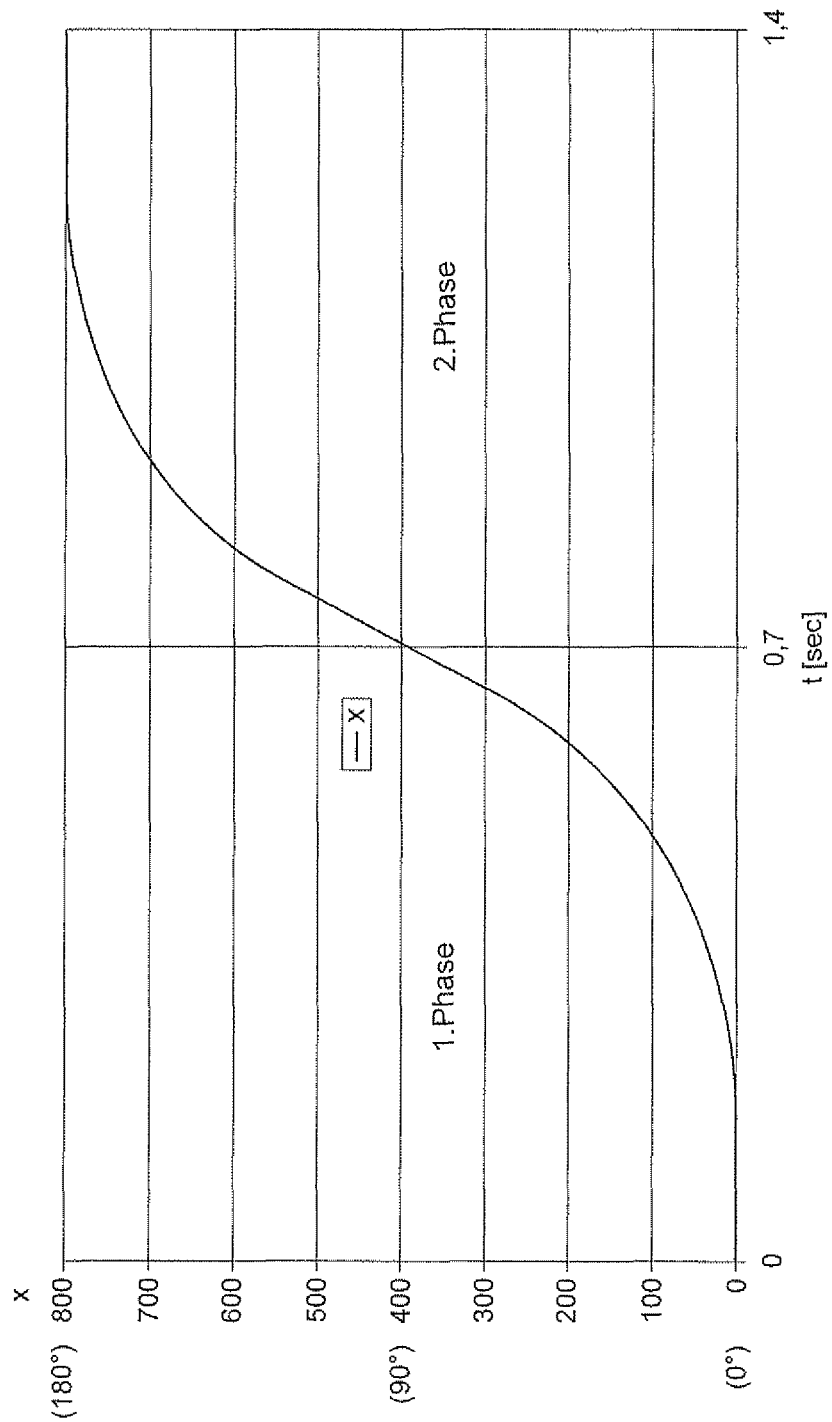
FIG. 9 shows the time characteristic of one pixel of the graphical object during a rotation of the representation of the display shown in FIG. 2 to the representation of the display shown in FIG. 8.

FIG. 9 shows the time characteristic of one pixel during the rotation by 180°. The pixel of the right edge of graphical object 6 travels from position 0 via the neutral position at position 400 up to the left edge of graphical object 6 at pixel 800. As apparent from FIG. 9, the pixel is accelerated in the first phase and decelerated in the second phase. In this case, the duration of the rotation was 0.7 second for each phase, so that the rotation by 180° was executed in 1.4 seconds.

According to exemplary embodiments, the data from the speedometer of the motor vehicle are transferred into control device 2, and therefore arithmetic logic unit 3, via vehicle bus 7. These data are used by arithmetic logic unit 3 to ascertain the duration of the rotation for the two phases. In this context, the higher the speed of the motor vehicle, the longer the duration of the total rotation.

The user is able to get back again from the view of graphical object 6 shown in FIG. 8 to the view of the other side of graphical object 6 shown in FIG. 2 by an input with the aid of input device 4. In this case, graphical object 6 is again rotated by 180°. In this instance, a rotation may again take place about a vertical axis at the right edge of display 1, the axis being shifted from the right side of display 1 to the left side of display 1 during the rotation. In the present exemplary embodiment, however, the rotation previously described in detail is reversed, so that the rotation is shown about a vertical axis which initially is located at the left edge of display 1, and is shifted to the right edge in the course of the rotation.

LIST OF REFERENCE NUMERALS

1 Display
2 Control device
3 Arithmetic logic unit
4 Input device
5 Axis of rotation
6 Object
7 Vehicle bus
8 System clock

What is claimed is:

1. A method for displaying information in a motor vehicle, comprising:
   graphically displaying, in a display mounted in the motor vehicle, at least one two-dimensional object in a first representation which shows one side of the object and in a second representation which shows another side of the object, different information being shown on the respective sides of the two-dimensional graphical object, in at least one of (a) the first representation and/or (b) the second representation, the graphical object extending substantially over an entire size of the display in at least one direction;
   altering the representation of the graphical object as a function of a control signal to rotate the graphical object from one side to the other side in a perspective representation on the display; wherein the two-dimensional graphical object is always fully displayed, at least perspectively, during the rotation;
   measuring a speed of the motor vehicle; and
   ascertaining at least one of (a) a duration of a total rotation of the graphical object as a function of the speed of the motor vehicle and/or (b) a duration of the rotation of at least one of (i) a first phase and/or (ii) a second phase of the graphical object as a function of the speed of the motor vehicle.

2. The method according to claim 1, wherein the control device alters the graphic data such that the graphical object is rotated about a vertical axis, which at least at a beginning of the rotation, at least one of (a) is outside of the graphical object and/or (b) extends through a laterally outermost point at an edge of the graphical object.

3. The method according to claim 2, wherein the control device alters the graphic data such that the vertical axis is shifted in a horizontal direction during the rotation, and at the same time, the graphical object is rotated about the vertical axis, so that after a rotation of 180°, the vertical axis has reached a position in the second representation.

4. The method according to claim 2, wherein the control device alters the graphic data such that a horizontal shift of the vertical axis is synchronized linearly with the rotation of the graphical object.

5. The method according to claim 1, wherein the rotation is subdivided into the first phase in which pixels of the graphical object are moved in accelerated fashion, and the second phase in which pixels of the graphical object are moved in decelerated fashion.

6. The method according to claim 5, wherein the first phase corresponds to an angle of rotation of the graphical object from 0° to 90°, and the second phase corresponds to an angle of rotation of the graphical object from 90° to 180°.

7. The method according to claim 5, wherein the following computations are carried out in calculating the graphic data for successive intermediate images to represent the rotation in the first phase:

$$n = \frac{t - t_0}{d_1} \quad \text{(i)}$$

$$x = b_1 + c_1 \cdot n^4 \quad \text{(ii)}$$

wherein:
   t represents a system time at which the generated graphic data are shown on the display, where $t = t_0$ at a beginning of the rotation of the first phase,
   $d_1$ represents the duration of the first phase,
   $b_1$ represents a starting position of a pixel of the graphical object,
   $c_1$ represents a total shift of the pixel of the graphical object in the first phase, and computations (i) and (ii) are repeated until: $t > (t_0 + d_1)$.

8. The method according to claim 5, wherein the following computations are carried out in calculating the graphic data for successive intermediate images to represent the rotation in the second phase:

$$n = \frac{t - t_0}{d_1} - 1 \quad \text{(i)}$$

$$x = b_2 + c_2 \cdot (1 - n^4) \quad \text{(ii)}$$

wherein:
   t represents a system time at which the generated graphic data are shown on the display, where $t = t_0$ at a beginning of the rotation of the second phase;
   $d_2$ represents the duration of the second phase;
   $b_2$ represents a starting position of a pixel of the graphical object;
   $c_2$ represents a total shift of the pixel of the graphical object in the second phase; and
   computations (i) and (ii) are repeated until: $t > (t_0 + d_2)$.

9. A display device for a motor vehicle, comprising:
a display mounted in the motor vehicle and adapted for graphical representation of information; and
a control device adapted to generate graphic data that represent at least one two-dimensional graphical object, displayable on the display, in a first representation which shows one side of the object, and in a second representation which shows another side of the object, different information being shown on the respective sides of the two-dimensional graphical object, in at least one of (a) the first representation and/or (b) the second representation, the graphical object extending substantially over an entire size of the display in at least one direction;
wherein the control device is adapted to alter the graphic data to rotate the graphical object from one side to the other side in a perspective representation on the display, the two-dimensional graphical object always being fully displayed, at least perspectively, during the rotation;
wherein the display device includes an interface adapted to receive data relating to a speed of the motor vehicle, the control device adapted to ascertain at least one of (a) a duration of a total rotation of the graphical object as a function of the speed of the motor vehicle and/or (b) a duration of the rotation for at least one of (i) a first phase and/or (ii) a second phase of the graphical object as a function of the speed data.

10. The display device according to claim 9, wherein the control device is adapted to alter the graphic data to rotate the graphical object about a vertical axis, which at least at a beginning of the rotation, at least one of (a) is outside of the graphical object and/or (b) extends through a laterally outermost point at an edge of the graphical object.

11. The display device according to claim 9, wherein the control device is adapted to alter the graphic data to shift a vertical axis in a horizontal direction during the rotation, and at the same time, to rotate the graphical object about the vertical axis, so that after a rotation of 180°, the vertical axis has reached a position in the second representation.

12. The display device according to claim 9, wherein the rotation is subdivided into the first phase in which pixels of the graphical object are moved in accelerated fashion, and the second phase in which pixels of the graphical object are moved in decelerated fashion.

13. The display device according to claim 12, wherein the control device is adapted to perform the following computations to calculate the graphic data for successive intermediate images to represent the rotation in the first phase:

$$n = \frac{t - t_0}{d_1} \quad \text{(i)}$$

$$x = b_1 + c_1 \cdot n^4 \quad \text{(ii)}$$

wherein:
t represents a system time at which the generated graphic data are shown on the display, where $t = t_0$ at a beginning of the rotation of the first phase;

$d_1$ represents the duration of the first phase;
$b_1$ represents a starting position of a pixel of the graphical object;
$c_1$ represents a total shift of the pixel of the graphical object in the first phase; and
the control device is adapted to repeat the computations (i) and (ii) until: $t > (t_0 + d_1)$.

14. The display device according to claim 12, wherein the control device is adapted to perform the following computations to calculate the graphic data for successive intermediate images to represent the rotation in the second phase:

$$n = \frac{t - t_0}{d_1} - 1 \quad \text{(i)}$$

$$x = b_2 + c_2 \cdot (1 - n^4) \quad \text{(ii)}$$

wherein:
t represents a system time at which the generated graphic data are shown on the display, where $t = t_0$ at a beginning of the rotation of the second phase;
$d_2$ represents the duration of the second phase;
$b_2$ represents a starting position of a pixel of the graphical object;
$c_2$ represents a total shift of the pixel of the graphical object in the second phase; and
the control device is adapted to repeat the computations (i) and (ii) until: $t > (t_0 + d_2)$.

15. A motor vehicle, comprising:
a display device including:
a display adapted for graphical representation of information; and
a control device adapted to generate graphic data that represent at least one two-dimensional graphical object, displayable on the display, in a first representation which shows one side of the object, and in a second representation which shows another side of the object, different information being shown on the respective sides of the two-dimensional graphical object, in at least one of (a) the first representation and/or (b) the second representation, the graphical object extending substantially over an entire size of the display in at least one direction;
wherein the control device is adapted to alter the graphic data to rotate the graphical object from one side to the other side in a perspective representation on the display, the two-dimensional graphical object always being fully displayed, at least perspectively, during the rotation;
wherein the display device includes an interface adapted to receive data relating to a speed of the motor vehicle, the control device adapted to ascertain at least one of (a) a duration of a total rotation of the graphical object as a function of the speed of the motor vehicle and/or (b) a duration of the rotation for at least one of (i) a first phase and/or (ii) a second phase of the graphical object as a function of the speed data.

* * * * *